United States Patent [19]

Kuwada

[11] 3,738,009
[45] June 12, 1973

[54] RULE AND COMPASS DEVICE
[76] Inventor: Edward A. Kuwada, 1053 South Kingsley Drive, Los Angeles, Calif. 90006
[22] Filed: Feb. 16, 1971
[21] Appl. No.: 115,541

[52] U.S. Cl. .................................. 33/27 C, 33/158
[51] Int. Cl. ............................................... B431 9/04
[58] Field of Search ................. 33/27 C, 158–160, 33/103, 111, 107; 235/70

[56] References Cited
UNITED STATES PATENTS
2,832,141   4/1958   Taylor ................................ 33/27 C
3,156,981   11/1964  Sutton ................................ 33/27 C
1,976,861   10/1934  Tombal .............................. 33/111

FOREIGN PATENTS OR APPLICATIONS
10,884      0/1898   Great Britain ...................... 33/111
1,473,243   2/1967   France ............................... 33/111

Primary Examiner—Harry N. Haroian
Attorney—William P. Green

[57] ABSTRACT

A drafting and calculating instrument including a rule body carrying compass points which are relatively adjustable to draw and/or measure circles of different sizes, and having also a slide rule element connected movably to the body, with slide rule scales formed thereon and on the body for effecting a calculation. An indicator having a slide rule hairline for reading the scales may also be mounted slidably to the body, and desirably carries one of the compass points.

16 Claims, 12 Drawing Figures

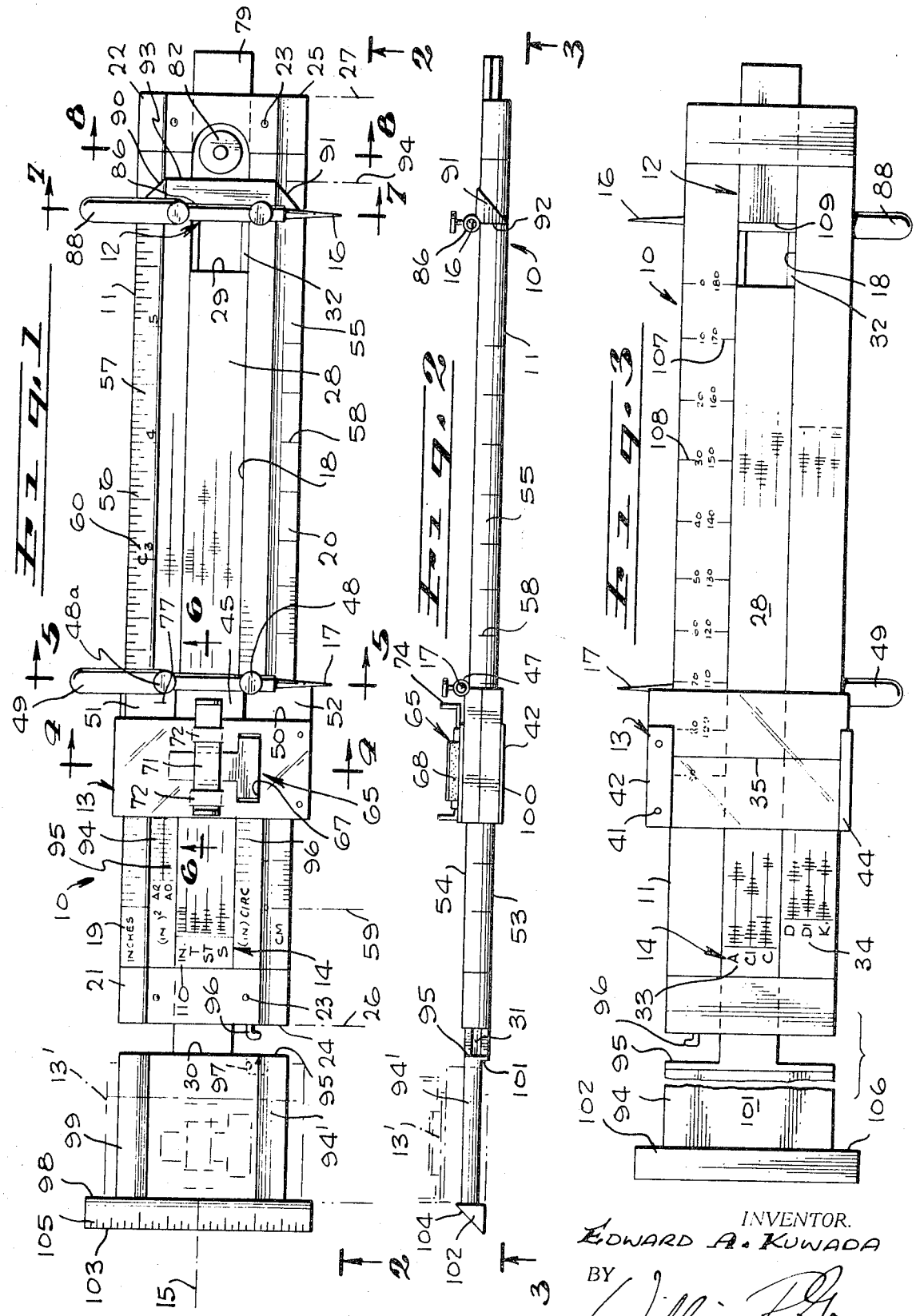

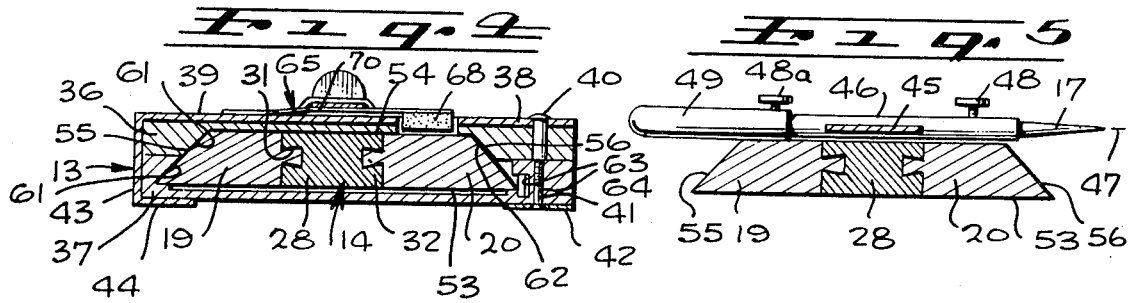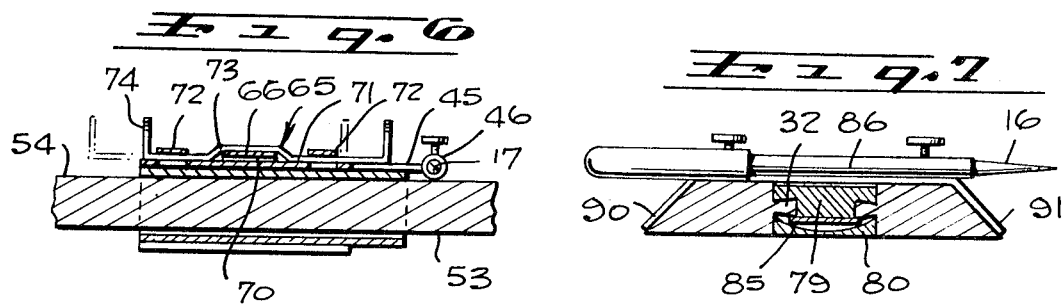

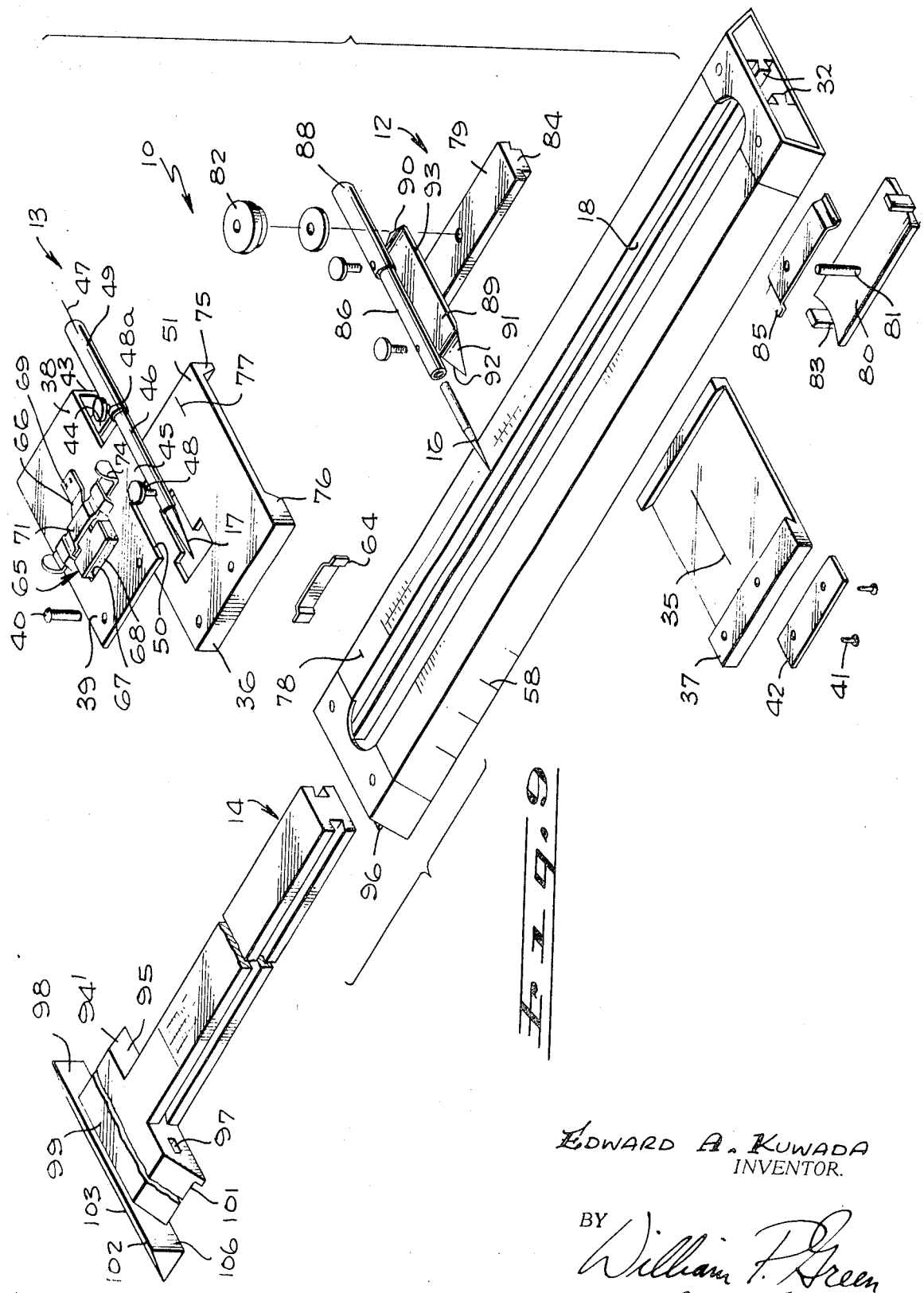

RULE AND COMPASS DEVICE

BACKGROUND OF THE INVENTION

This invention relates to improved instruments for use in drawing circles or arcs, taking measurements on circles, arcs, or other drawings or devices, making calculations relative to the arcs or circles, and making slide rule type calculations.

There have heretofore been provided devices referred to as 'beam compasses,' including an elongated ruler body carrying a pair of compass points which may be adjusted relative to one another for use in drawing or measuring circles. However, all such prior beam compasses of which I am aware have been very limited in the types of operations that they can perform, and have been incapable of giving any information beyond the most basic radius measurement relative to the circles which they draw, or performing any other types of calculations.

SUMMARY OF THE INVENTION

The present invention provides a unique drafting and calculating device which will serve very effectively as a beam compass of the above discussed type for making or measuring circles or arcs of different radii, and which in addition will perform one or more other highly useful functions, in a manner reducing the amount of equipment required of, for example, an engineer, technician, or student. For one thing, a device embodying the invention may be constructed to automatically indicate to a user the area of a circle which is drawn or measured by the compass points, and/or the circumference of a circle. Further, the device may be utilized to measure angles on the circumference of a circle of a particular size.

Certain additional features of the invention relate to the preferred construction of the device to serve also as a slide rule, having a slide element on which logarithmic scales are formed for coacting with associated scales on the body of the device to make slide rule type calculations. Preferably, the indicator element or 'index glass' of the slide rule, in addition to carrying a hairline marking for reading the logarithmic slide rule scales, also serves as a movable carrier for one of the previously mentioned compass points, enabling shifting movement of that point to different positions relative to the rule body by movement of the indicator element. For holding the indicator in a desired set position when the device is to be utilized as a beam compass, a frictional braking unit may be provided on the indicator element.

BRIEF DESCRIPTION OF THE DRAWINGS

The above and other features and objects of the invention will be better understood from the following detailed description of the typical embodiment illustrated in the accompanying drawings in which:

FIG. 1 is a plan view of a rule device constructed in accordance with the invention;

FIG. 2 is a side view taken on line 2—2 of FIG. 1;

FIG. 3 is a bottom view of the rule device, taken on line 3—3 of FIG. 2;

FIGS. 4, 5, 6, 7, and 8 are vertical sections taken on lines 4—4, 5—5, 6—6, 7—7, and 8-8 respectively of FIG. 1;

FIG. 9 is an exploded perspective view showing the manner of construction of the individual parts of the device;

FIG. 10 illustrates the device as it appears while being used to draw a circle or arc;

FIG. 11 illustrates the device while being used to measure off a desired angle on an arc previously drawn by the device; and FIG. 12 shows the device while being used to draw a series of equally spaced parallel lines.

DESCRIPTION OF THE PREFERRED EMBODIMENTS

Referring first to FIG. 1, I have illustrated at 10 in that figure a preferred form of rule device embodying the invention, and including an elongated body 11, and three slides 12, 13, and 14 mounted to the body for sliding movement along its longitudinal axis 15. The slides 12 and 13 detachably carry two compass points 16 and 17, each of which may in different use situations be either a sharpened lead for marking purposes or a rigid metal point or needle adapted to serve as a center in drawing a circle or as a caliper point in measuring distances on a drawing or device. In FIG. 1, I have typically illustrated a situation in which the left-hand one of the two points 17 is a rigid metal element and the other point 16 is a pencil lead.

The rule body 11 is elongated in the direction of axis 15, and contains an elongated guideway 18 which extends parallel to axis 15 and has along its entire length a uniform cross section of the shape illustrated in FIGS. 4, 5, 7, and 8. This guideway is essentially very similar to that usually provided in a slide rule, and is formed by two spaced parallel elongated body halves or sections 19 and 20, rigidly interconnected at their opposite ends by two encircling rigid metal bands or loops 21 and 22 to which members 19 and 20 may be secured by rivets 23 or the like. At its opposite ends, body 11 has opposite end surfaces 24 and 25 lying in planes 26 and 27 disposed transversely of axis 15, with these surfaces 24 and 25 being defined by and formed on the ends of the various parts 19, 20, 21, and 22 of the body.

Within guideway 18, slide 14 has an elongated portion 28 forming a slide stick which, from its transverse end surface 29 to the location 30 of FIG. 1, has a uniform cross section corresponding to that shown in FIGS. 4 and 5. This cross section is a close sliding fit within guideway 18, to mount slide 14 for movement parallel to axis 15 relative to body 11. More particularly, portion 28 of slide 14 may at its opposite sides contain two longitudinally extending parallel grooves 31, within which elongated parallel longitudinal tongues 32 formed on members 19 and 20 are slidably received in guiding relation (see FIG. 4).

At one of its sides, specifically that seen in FIG. 3, portion 28 of slide 14 has a series of logarithmic slide rule scales formed thereon at 33, and member 19 of the rule body has an associated or coacting series of logarithmic slide rule scales 34 readable against the scales 33. In particular, the scales ordinarily referred to as the "A," "C1," and the "C" scales may be provided on slide 14 while the "D," "D1," and "K" scales may be provided on the rule body vertically opposite the A, C1, and C scales. As will be apparent, slide 14 is shiftable longitudinally relative to the body to perform multiplication, division, and other types of calculations for which a slide rule is conventionally used. The slide or cursor 13 serves as the indicator slide or index glass for this slide rule assembly, having a hairline marking 35 disposed transversely of axis 15 and located opposite the scales 33 and 34 so that each of the scales may be read by the hairline against each of the other scales. To increase the versatility of the device, slide 14 may be reversible within guideway 18 and have a second group of scales (e.g. the S, T and ST scales) at its second side for making calculations with the D, D1 and K scales when so reversed. An inch scale 110 may also be provided on one of the sides of slide 14, for coaction with scale 57 in adding and subtracting inch measurements.

The slide 13 forms in essence a loop disposed about body 11 and slidable therealong parallel to axis 15. As seen in FIGS. 4 and 9, this slide 13 may include two desirably transparent complementary sections 36 and 37, received at opposite sides respectively of body 11, and typically molded from an appropriate rigid resinous plastic material such as methylmethacrylate. As viewed in FIGS. 1 and 3, these two sections 36 and 37 are rectangular in outline. Section 37 forms a transparent window at one side of the body 11 through which all of the scales formed at that side of the body are visible, and on which the previously mentioned hairline 35 is formed for coaction with the scales. The two sections or halves 36 and 37 may be secured rigidly together in any suitable manner, preferably by means including a bracket 38 formed of rigid sheet metal and defining an essentially rectangular top wall 39 extending across the upper side of section 36. This upper wall 39 of bracket 38 may be secured in place by two threaded nuts 40 projecting downwardly through openings in wall 39 and into openings in body sections 36 and 37 and connected to a pair of screws 41 which extend upwardly through openings in a bottom plate 42 clamped against the underside of bottom section 37. At the opposite edge of wall 39, bracket 38 extends downwardly at 43 adjacent the side edges of slide sections 36 and 37, and then inwardly a short distance at 44 to retain sections 36 and 37 tightly together at that side of the slide.

As will be apparent from FIGS. 1 and 9, the top wall 39 of bracket 38 forms a rigid tab 45 projecting parallel to axis 15 and to which there is rigidly secured a holder 46 for one of the compass points 17. This holder 46 may typically be an elongated tube having an axis 47 which lies in a plane disposed transversely of main axis 15 of the device, to receive point 17 and hold it in a position of projection along axis 47. The tube or holder 46 may be appropriately brazed, welded, or otherwise secured to tab 45 in fixed position relative thereto. The point 17 is releasably held in fixed position in holder 46 by means of a lock screw 48 tightenable against the point. The opposite end of tubular holder 46 may removably carry a tubular closed end element 49 which may be retained by a screw 48a and which projects far enough beyond the edge of body 11 to function as a handle for holding point 17 when drawing a circle or arc, or making a measurement. As will be apparent, the point and handle 49 can be reversed to position the point adjacent either the inch or the metric scale as desired. At opposite sides of tab 45, the top wall 39 of bracket 38 may be cut away to define two edges 50 spaced from and parallel to holder 46 forming viewing windows 51 and 52 through which the later to be discussed scales and markings on body 11 may be viewed. The top transparent section 36 of slide 13 is wider than bracket 38 at the locations of these windows 51 and 52, and extends across these window areas.

As seen best in FIGS. 4 and 5, body 11 and its two sections 19 and 20 form a planar undersurface 53 of the body, and a parallel planar upper surface 54. Along the opposite edges of the body, sections 19 and 20 may have inclined edge surfaces 55 and 56, on which two measuring scales 57 and 58 are formed. Scale 57 may be measured off in inches and fractions thereof, while scale 58 may be measured in centimeters and fractions thereof, with the zero points of the two scales being aligned in a common transverse plane 59. The opposite sides of body 11 may thus be utilized as straight edges for drawing measured lines. Desirably, scale 57 includes 6 inches, with the 3 inch point having an additional marking at 60 (FIG. 1) indicating that it is the "center line," to be utilized in a manner which will be discussed at a later point. The internal configuration of sections 36 and 37 of slide 13 is such as to fit closely over the above discussed transverse sectional configuration of rule body 11. For this purpose, sections 36 and 37 slidably engage the upper and lower surfaces 54 and 53 of body 11, and have inclined surfaces 61 engaging the previously mentioned inclined edge surface 55 of body member 19. Similarly, at the opposite side of the rule body, top section 36 may have an inclined surface 62 received closely adjacent inclined surface 56 of body section 20. The lower slide section 37 at this side of the body may be shaped to define a recess 63 containing a leaf spring 64 acting to exert yielding force against the edge of body section 20 in a manner maintaining surfaces 55 and 61 in tight sliding engagement, and thereby maintaining slide 13 in an accurately fixed orientation with respect to body 11.

When slide 13 and its point 17 are being employed as a portion of a compass, slide 13 is preferably locked rigidly in a set position along body 11. For this purpose, slide 13 is provided with a braking or locking element 65, which may include a T-shaped essentially stiff but slightly deformable piece of sheet metal 66 receivable within a correspondingly T-shaped aperature 67 in top wall 39 of bracket 38, and carrying a high friction pad or cushion 68 formed of rubber or the like and engageable downwardly against section 20 of the rule body 11 to lock slide 13 against relative movement. This friction pad 68 may be carried by the crosspiece of the "T," with the opposite end of the T being permanently and rigidly secured to bracket 38 as by spot welding at 69. In extending from the location 69, the web of the T may normally curve slightly upwardly at 70, to normally function by its own resilience to retain pad 68 out of engagement with the rule body. For actuating the locking element 66 downwardly to its braking position, there may be provided a rigid actuating element 71, which is guided by two loops 72 formed by the material of bracket 38 for sliding movement in a leftward or rightward direction as viewed in FIG. 6, and which has an upwardly offset portion 73 normally receiving the web of T-shaped element 66. When actuating element 71 is shifted from its full line to its broken line position of FIG. 6, the element 71 acts to cam the locking element downwardly to its braking position. Element 71 is movable between its locking and retracted positions by means of an upwardly turned handle tab 74 formed at an end of element 71. For reading accurately the position of point 17 along scale 57 or 58, the transparent upper section 36 of slide 13 has two edges 75 and 76, which lie in the same transverse plane 47 as does point 17, and which are received directly adjacent and are inclined in correspondence with scales 57 and 58 to be very accurately readable thereon. Also, the window portion of section 36 at the location 51 may carry a transverse index marking or line 77 which when brought directly over a similar marking 78 formed on body section 19 indicates that point 17 is located at exactly the location of the zero marking on scales 57 and 58.

Slide 12 which carries compass point 16 is mounted in the same guideway 18 as is slide 14, but is located axially therebeyond. As seen in FIGS. 7, 8, and 9, slide 12 may be formed of two upper and lower sections 79 and 80, which engage the upper and lower sides respectively of the two tongues 32 of body sections 19 and 20, and which are interconnected by a screw 81 projecting upwardly from bottom section 80 through an opening in top section 79 and carrying a nut 82 which is tightenable to lock slide 12 in any desired set position. Ears or flanges 83 are formed at opposite ends of bottom section 80 and may be engageable with a downwardly projecting central portion 84 of top section 79, to hold the two sections against relative axial movement. A spring 85 between sections 79 and 80 yieldingly urges them relatively apart so that upon slight loosening of nut 82, slide 12 is very freely movable axially to different positions in guideway 18. Slide 14 will of course move within guideway 18 as necessary to allow any desired shifting of slide 12, and if necessary in a particular instance slide 14 can be completely removed from body 11 while slide 12 is shifted to a particular position in the guideway.

Secured to one end of section 79 of slide 12, there is provided a tubular point holder 86 which may be the same as holder 46 of slide 13, and be disposed parallel thereto. As in the case of holder 46, a handle 88 may be mounted about one end of the tube, to project to a position corresponding to that of the previously discussed handle 49 on tube 46 for use in holding point 16 in a fixed position. Also, the point and handle may be reversed to project in directions the opposite of those shown in the figures.

Adjacent tube 86, the section 79 of slide 12 carries a pointer or reading element 89, which may be formed of sheet metal and which has two pointed ends 90 and 91 extending downwardly at an inclination in close proximity to the inclined faces 55 and 56 of body 11, to take readings on their scales 57 and 58. At first sides of pointer ends 90 and 91, these elements have straight edges 92 which are aligned in a common vertical plane disposed transversely of axis 15 and containing point 16, to thus indicate on the scales the precise setting of point 16. The opposite sides of pointers 90 and 91 may extend angularly away from edges 92, and to the plane of another reading edge 93 of element 89 which edge lies in another transverse plane 94 disposed transversely of axis 15 to be utilized in taking readings on additional scales 94, 95, and 96. These scales are utilized in determining the area or circumference of a circle drawn or measured by the compass points of the device. More particularly, if point 17 is set at zero on scale 57, and point 16 is set at a position on that scale 57 representing the radius of a particular circle which is to be drawn by points 16 and 17, the reading which may then be taken on scale 94, by noting the position of edge 93 on scale 94, will give the area of the circle for whose radius points 16 and 17 are set. Scale 95 similarly gives the area of a circle having a diameter corresponding to the distance between points 16 and 17, and scale 96 gives the circumference of a circle having a radius corresponding to the distance between the points. With regard to the range of movement of slide 12, the sections 79 and 80 of that slide are shaped and positioned to be slidable into end piece 22 of body 11 in the FIG. 1 extreme position of slide 12. Also, element 22 may be semicircularly cut away at 97 to partially receive nut 82, to attain a maximum range of movement of slide 12 within body 11.

At a location axially beyond the left end of body 11, as viewed in FIG. 1, slide 14 has an enlarged portion 94'. This enlarged head 94' has a transverse surface 95 at one side which is received closely adjacent the end surface 24 of body 11 in a fully inserted position of slide 14, with the head being releasably retainable in that position by a spring detent 96 engageable in detenting relation with a shoulder formed within a recess 97 in head 94. From the plane of surface 95 to a transverse plane 98, head 94 may have a cross section corresponding generally to the cross section which body 11 would have if guideway 18 were filled in. Thus, slide 13 can be moved axially off of body 11 and slide onto the portion 99 of head 94 for retention thereon when slide 13 is not to be used. This inactive position of slide 13 is represented in broken lines 13' in the left portion of FIG. 1. In that position, the slide 13 is shiftable upwardly (toward the viewer in FIG. 1) a short distance relative to head 94, in order to bring the undersurface 100 of the slide into the same plane as the undersurfaces 53 of body sections 19 and 20 (see broken line position of slide 13 in FIG. 2). To enable such upward shifting movement, the head 94 has a shallow recess 101 in its underside into which the bottom section 37 of slide 13 is movable upwardly. This then allows the undersurface of body 11 to be placed in direct engagement with a sheet of paper to facilitate the drawing of lines thereon by the straight edges adjacent scales 57 and 58. Axially beyond plane 98 in FIG. 1, head 94 has a portion 102 defining a straight edge 103 which is perpendicular to axis 15 and the straight edges formed on opposite sides of body 11, with an inclined surface 104 adjacent the straight edge having a scale 105 with evenly spaced markings, typically measured in inches and fractions thereof. A shoulder 106 formed on head 94 in the plane 98 prevents unintentional movement of slide 13 axially beyond the broken line position of FIG. 1 and off of the head.

Two additional scales which have not thus far been described are provided at 107 and 108 on the back side of section 20 of body 11. Scale 107 is measured off in circular degrees from 0 to 90, and scale 108 is marked off reversely on member 20 from 90° to 180°. In using these scales, the point 16 is set to a position of alignment with the 6 inch marking on scale 57, and the angle reading is then determined by the position of hairline 35 of slide 13 on scales 107 and 108. This angle reading indicates the angle which is marked off on a circle of a particular size between points 16 and 17 when the points are in the specified settings. The circle of this particular size is drawn by first positioning point 17 at the 3 inch marking on scale 57 (this being the purpose for the "center line" marking 60 on that scale), and positioning point 16 at the location of the 6 inch marking on the scale 57. With the points 16 and 17 at these locations, a circle drawn by lead point 16 about a center defined by point 17 will be a circle of 3 inch radius and is precisely the size for which scales 107 and 108 on the back side of the body are designed. To measure a particular angle on the circumference of such a 3 inch radius circle, the device is utilized as shown in FIG. 11, with point 16 being positioned at the 6 inch location on scale 57 (as in FIG. 1), and with hairline 35 being located at the desired angle *a* on the scales. As will be apparent, with the points thus set, point 17 may be placed at any desired location on the circumference of the circle, and point 16 may then be swung to draw an arc intersecting the circle at another location, and the circular distance between these two locations will be the angle indicated by scale 107 or 108. Scale 107 gives the reading when the arc is swung from a 0 degree location, and scale 108 gives the angle when the reading is taken backwards from a 180 degree starting point.

To summarize very briefly some of the ways in which the present device may be utilized, assume first of all that it is desired simply to draw a circle of a particular radius. This may be done by setting point 17 at the zero location on scales 57 and 58, and then setting slide 12 to a desired radius reading on either the inch scale 57 or metric scale 58, locking both of the slides 13 and 12 in the set positions, then positioning point 17 at the desired center of the circle (see FIG. 10), and swinging the entire unit about that center so that point 16 draws the circle. With the slides still in these settings, the position of edge 93 of slide 12 with respect to scales 94, 95, and 96 indicates the area of the drawn circle, the area of a circle having a diameter corresponding to the distance between points 16 and 17, and the circumference of the drawn circle. Further, if the drawn circle is one of three inch radius, scales 107 and 108 can be employed to measure off angles on its circumference as has been discussed in detail above.

When slide rule type calculations are to be made by the device, the brake or lock 65 of slide 13 is released, slide 14 is moved appropriately to attain the desired calculations by the various scales 33 and 34 on this slide and body 11, and the hairline 35 on slide 13 is employed to take a reading on the slide rule scales or to determine the setting of slide 14. The T, ST and S scales may be used by reversing slide 14 to locate these scales on the same side of the device as scales D, D1 and K.

FIG. 12 shows another manner of use of the device, for drawing a series of parallel lines 115 on a sheet of paper. In drawing such lines, the transverse straight edge 103 on the enlarged head portion 94 of slide 14 is positioned in alignment with a guideline or edge 116 formed on the sheet or on a drawing board to which the sheet is attached, and the edges 117 and/or 118 of body 11 (adjacent scale 57 and 58) may then be employed for drawing the lines 115. After a first of the lines 115 has been drawn with a particular one of the markings of scale 105 opposite a particular index point 119 on guideline 116, the entire device 10 may be shifted downwardly so that a next successive one of the markings of scale 105 is opposite index marking 119, to draw a next successive one of the lines 115, etc. During this use of the device, slide 13 is moved to its inactive position on head 94, so that as discussed previously, the undersurface of body 11 may be placed directly against the upper surface of the sheet of paper without interference being offered by slide 13.

While certain specific embodiments of the present invention have been disclosed as typical, the invention is of course not limited to these particular forms, but rather is applicable broadly to all such variations as fall within the scope of the appended claims.

I claim:

1. A device comprising an elongated rule body, two relatively adjustable compass points carried by said body, a first slide element carrying one of said points and mounted by said body for sliding movement therealong and toward and away from the other of said points to vary the distance between the points; an elongated second slide element mounted by said body for longitudinal sliding movement relative thereto, and logarithmic slide rule scales on said body and said second slide element readable against one another to make a slide rule calculation, said second slide element having an elongated relatively narrow first portion slidably received within a guideway in said body, and an enlarged head portion carried by said narrower portion at a location beyond an end of said guideway and having a width greater than the narrower portion, said body having a straight edge along one side thereof with scale markings and adapted to be used in drawing a straight line, and said enlarged portion of the second slide element having a straight edge disposed perpendicular to said straight edge of the body and perpendicular to the direction of sliding movement of said slide elements and having scale markings.

2. A device comprising a body, means for mounting two compass points to said body for relative adjusting movement to draw or measure a circle having a radius corresponding to the distance between said points, said means including a slide element mounted to said body for relative sliding movement therealong and carrying one of said points to adjust the distance between it and the other point, a scale carried by said body having angle markings which indicate for a particular size circle the size of angle marked off on the circumference of said circle by said two points, additional scales on said body indicating the area of a circle having a radius or diameter corresponding to the spacing between said compass points at different settings thereof and indicating the circumference of a circle having such a radius, said body having a guideway slidably receiving said slide element, an elongated second slide element mounted slidably within said guideway, coacting logarithmic slide rule scales on said body and said second slide element, said compass point mounting means including a third slide element mounted slidably about and to said body and carrying said other compass point, said third slide element having a hairline indicator marking coacting with said slide rule scales, said second slide element having an enlargement extending beyond said guideway and said body and shaped to detachably carry said third slide element in an inactive position thereof, said body having a straight edge extending parallel to said guideway, and said enlargement having a straight edge extending perpendicular to said first mentioned straight edge and perpendicular to the guideway.

3. A device comprising an elongated rule body, two relatively adjustable compass points carried by said body, a first slide element carrying one of said points and mounted by said body for sliding movement therealong and toward and away from the other of said points to vary the distance between the points; an elongated second slide element mounted by said body for longitudinal sliding movement relative thereto, logarithmic slide rule scales on said body and said second slide element readable against one another to make a slide rule calculation, a slide rule indicator element mountable slidably on said body for shifting movement therealong and having a marking simultaneously coacting with said slide rule scales on both said body and said second slide element, and means for attaching said indicator element in a predetermined inactive position to said second slide element.

4. A device as recited in claim 3, in which said second slide element is slidably received within a guideway in said body, said attaching means including an enlargement carried by said second slide element beyond said body and having an external size similar to said body, said indicator element being received slidably about said body and being movable to a position about said enlargement of the second slide element in said inactive position.

5. A device as recited in claim 4, in which said attaching means include means for releasably locking said indicator element in said inactive position about said enlargement.

6. A device as recited in claim 3, in which said second slide element is slidably received within a guideway in said body, said attaching means including an enlargement carried by said second slide element beyond said body and having an external size similar to said body, said indicator element being received slidably about said body and being movable to a position about said enlargement of the second slide element in said inactive position, said body having an undersurface, said indicator element having a portion projecting beneath the level of said undersurface when the indicator element is received about the body, said enlargement being recessed at its underside in a relation enabling said indicator element to be raised to a slightly higher plane when received about the enlargement than when received about the body and thereby enabling engagement of said undersurface of the body with a planar supporting surface.

7. A device comprising an elongated rule body containing an elongated guideway extending along a predetermined axis longitudinally within the body, an elongated slide stick mounted slidably within said guideway for longitudinal movement parallel to said axis, logarithmic slide rule scales on said body and said slide stick readable against one another to make a slide rule calculation, a cursor disposed about said body and stick and mounted to the body for longitudinal sliding movement therealong parallel to said axis and relative to both the body and stick, said cursor having a reference line disposed transversely of said axis and readable simultaneously against aligned portions of said logarithmic scales on both the body and stick, a first compass point carried by said cursor for sliding movement therewith, a second compass point which may be spaced from said first point longitudinally of said axis and coacting with said first point to enable use of said device as an adjustable beam compass and an additional slide element mounted by said body for slid movement therealong parallel to said axis and relative to both said slide stick and cursor and carrying said second compass point for adjusting movement therewith.

8. A device as recited in claim 7, including a compass scale on said body for indicating the distance between said two points in any particular setting thereof.

9. A device as recited in claim 7, including locking means for releasably retaining said cursor in different settings on said body.

10. A device comprising an elongated rule body containing an elongated guideway extending along a predetermined axis longitudinally within the body, an elongated slide stick mounted slidably within said guideway for longitudinal movement parallel to said axis, logarithmic slide rule scales on said body and said slide stick readable against one another to make a slide rule calculation, a cursor disposed about said body and stick and mounted to the body for longitudinal sliding movement therealong parallel to said axis and relative to both the body and stick, said cursor having a reference line disposed transversely of said axis and readable simultaneously against aligned portions of said logarithmic scales on both the body and stick, an enlargement carried by said slide stick beyond said body and having an external size larger than said guideway and similar to that of said body, said cursor being slidable axially off of said body and to an inactive position about said enlargement.

11. A device as recited in claim 10, in which said body has an undersurface, said cursor having a portion projecting beneath the level of said undersurface when the cursor is received about said body, said enlargement being recessed at its underside in a relation enabling said cursor to be raised to a slightly higher plane when received about the enlargement than when received about the body and thereby enabling engagement of said undersurface of the body with a planar supporting surface.

12. A device comprising an elongated rule body containing an elongated guideway extending along a predetermined axis longitudinally within the body, an elongated slide stick mounted slidably within said guideway for longitudinal movement parallel to said axis, logarithmic slide rule scales on said body and said slide stick readable against one another to make a slide rule calculation, a cursor disposed about said body and stick and mounted to the body for longitudinal sliding movement therealong parallel to said axis and relative to both the body and stick, said cursor having a reference line disposed transversely of said axis and readable simultaneously against aligned portions of said logarithmic scales on both the body and stick, a first compass point carried by said cursor for sliding movement therewith, a second compass point which may be spaced from said first point longitudinally of said axis and coacting with said first point to enable use of said device as an adjustable beam compass, and means for attaching said cursor in a predetermined inactive position to said slide stick.

13. A device comprising an elongated rule body containing an elongated guideway extending along a predetermined axis longitudinally within the body, an elongated slide stick mounted slidably within said guideway for longitudinal movement parallel to said axis, logarithmic slide rule scales on said body and said slide stick readable against one another to make a slide rule calculation, a cursor disposed about said body and stick and mounted to the body for longitudinal sliding movement therealong parallel to said axis and relative to both the body and stick, said cursor having a reference line disposed transversely of said axis and readable simultaneously against aligned portions of said logarithmic scales on both the body and stick, a first compass point carried by said cursor for sliding movement therewith, a second compass point which may be spaced from said first point longitudinally of said axis and coacting with said first point to enable use of said device as an adjustable beam compass, and an enlargement carried by said slide stick beyond said body and having a width greater than that of said stick and corresponding generally to that of said body and onto which said cursor is slidably movable from the body in a predetermined inactive position.

14. A device as recited in claim 13, in which said body has a straight edge for use in drawing a straight line parallel to said axis, said enlargement having a straight edge for use in drawing a straight line perpendicular to said axis.

15. A device comprising an elongated rule body containing an elongated guideway extending along a predetermined axis longitudinally within the body, an elongated slide stick mounted slidably within said guideway for longitudinal movement parallel to said axis, logarithmic slide rule scales on said body and said slide stick readable against one another to make a slide rule calculation, a cursor disposed about said body and stick and mounted to the body for longitudinal sliding movement therealong parallel to said axis and relative to both the body and stick, said cursor having a reference line disposed transversely of said axis and readable simultaneously against aligned portions of said logarithmic scales on both the body and stick, a first compass point carried by said cursor for sliding movement therewith, a second compass point which may be spaced from said first point longitudinally of said axis and coacting with said first point to enable use of said device as an adjustable beam compass, and detent means for releasably retaining said slide stick in a predetermined position relative to said body.

16. A device comprising an elongated rule body containing an elongated guideway extending along a predetermined axis longitudinally within the body, an elongated slide stick mounted slidably within said guideway for longitudinal movement parallel to said axis, logarithmic slide rule scales on said body and said slide stick readable against one another to make a slide rule calculation, a cursor disposed about said body and stick and mounted to the body for longitudinal sliding movement therealong parallel to said axis and relative to both the body and stick, said cursor having a reference line disposed transversely of said axis and readable simultaneously against aligned portions of said logarithmic scales on both the body and stick, a first compass point carried by said cursor for sliding movement therewith, a second compass point which may be spaced from said first point longitudinally of said axis and coacting with said first point to enable use of said device as an adjustable beam compass, and an additional slide element mounted slidably in said guideway beyond said slide stick and carrying said second compass point.

* * * * *